(No Model.) 2 Sheets—Sheet 1.

A. P. GATHRIGHT.
MACHINE FOR SHARPENING GIN SAWS.

No. 290,031. Patented Dec. 11, 1883.

Witnesses:
Phil. C. Dieterich
J. R. Littell

Inventor:
A. P. Gathright
by C. A. Snow & Co.
Attorneys.

(No Model.) 2 Sheets—Sheet 2.
A. P. GATHRIGHT.
MACHINE FOR SHARPENING GIN SAWS.
No. 290,031. Patented Dec. 11, 1883.
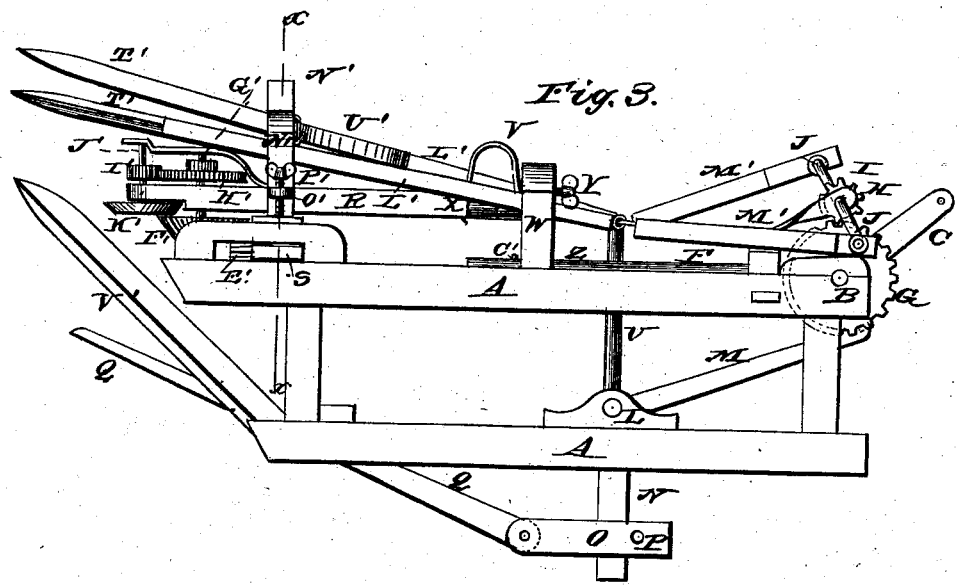
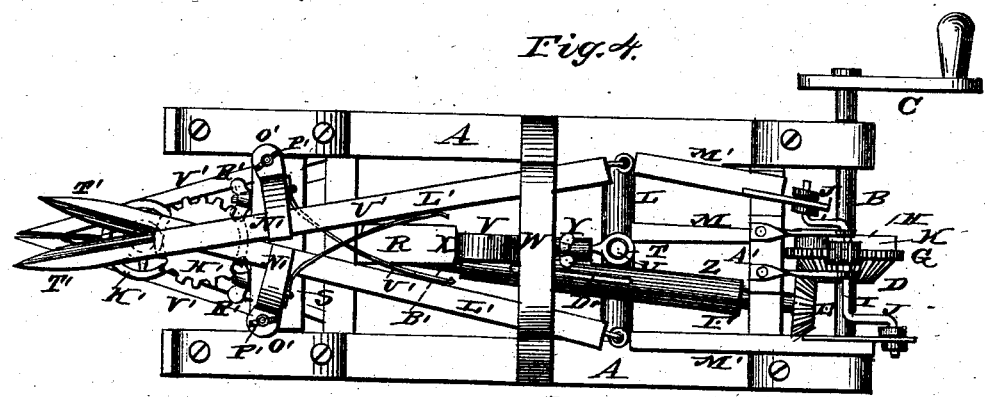
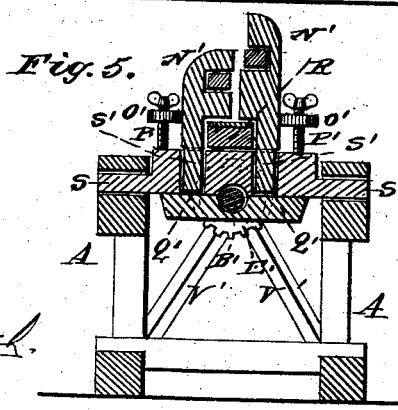
Witnesses:
Phil. C. Dietrich.
J. R. Littell.
Inventor:
A. P. Gathright,
by A. Snow & Co.
Attorneys.

UNITED STATES PATENT OFFICE.

ALBERT P. GATHRIGHT, OF NICHOLSON, GEORGIA, ASSIGNOR OF ONE-HALF TO WILLIAM C. POTTS, OF SAME PLACE.

MACHINE FOR SHARPENING GIN-SAWS.

SPECIFICATION forming part of Letters Patent No. 290,031, dated December 11, 1883.

Application filed July 26, 1882. (No model.)

*To all whom it may concern:*

Be it known that I, ALBERT P. GATHRIGHT, of Nicholson, in the county of Jackson and State of Georgia, have invented certain new and useful Improvements in Machines for Sharpening Gin-Saws; and I do hereby declare that the following is a full, clear, and exact description of the invention, which will enable others skilled in the art to which it appertains to make and use the same, reference being had to the accompanying drawings, which form a part of this specification.

Figure 1:
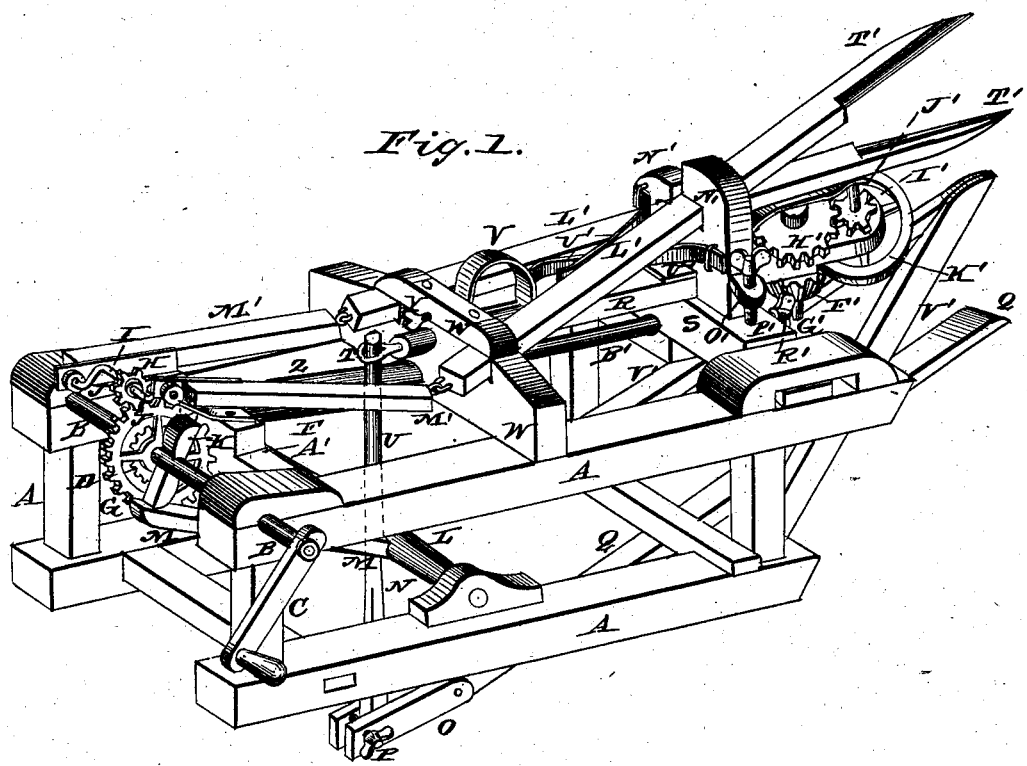
Figure 2:
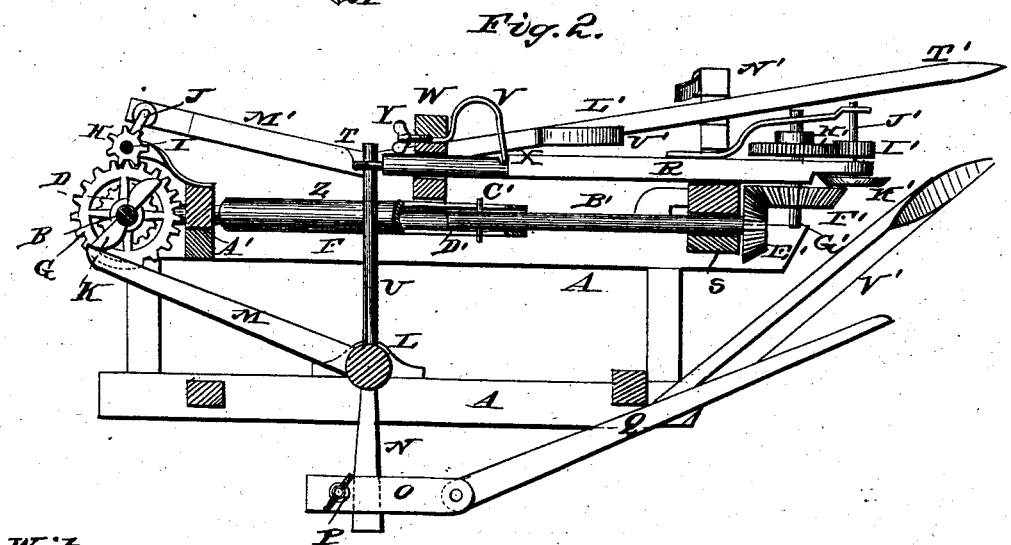

Figure 1 is a perspective view. Fig. 2 is a longitudinal vertical sectional view. Fig. 3 is a side view. Fig. 4 is a top view. Fig. 5 is a vertical cross-section on the line $x\,x$, Fig. 3.

Corresponding parts in the several figures are denoted by like letters of reference.

This invention relates to machines for sharpening gin-saws; and it consists in certain improvements in the construction of the same, which will be hereinafter fully described, and particularly pointed out in the claims.

In the drawings hereto annexed, A represents the frame of the machine, at the rear end of which the main shaft B is journaled transversely in suitable bearings. Said main shaft, which is driven by a crank, C, transmits motion through miter-gears D E to a longitudinal shaft, F. It is also provided with a cog-wheel, G, meshing with a pinion, H, upon a shaft, I, having cranks J J, and with a cam, K, the operation of which will be presently described.

L is a rock-shaft, mounted transversely in the lower part of the frame, and having a rearward-projecting arm, M, engaging the cam K. Rock-shaft L is also provided with a downward-projecting arm, N, upon which a plate or clutch, O, is vertically adjustable by a set-screw, P. To said plate is hinged a forward-extending pawl, Q, which projects slightly in front of the machine, so as to engage the teeth of the saw which has been suitably mounted for sharpening, and turn the said saw forward the space of one tooth at each stroke or operation. The stroke may be regulated to suit saws with teeth of various sizes by adjusting the plate O upon arm N.

Mounted in suitable bearings upon the top of frame A is a longitudinally-sliding shaft, R, having near its front end a cross-head, S, for which bearings are also provided. An eye or socket, T, is provided at the rear end of shaft R, to receive an arm, U, projecting upward from the rock-shaft L, from which a longitudinal reciprocating motion may thus be transmitted to the shaft and cross-head R S.

V is a bow-spring, arranged between a transverse frame-bar, W, and a shoulder, X, upon shaft R, thereby forcing the latter automatically in a forward direction and holding the arm M of rock-shaft L in contact with the cam K. The tension of spring V may be regulated by a set-screw, Y, working in the frame-bar W.

The shaft F is a telescopic shaft, consisting of a tubular section, Z, mounted in a frame-bar, A', and carrying at its rear end the pinion E, meshing with the bevel-gear D of the main shaft, and of a solid section, B', sliding in section Z, with which it is connected by a transverse pin, C', sliding in slots D' in said section Z. The front end of section B' is mounted in the cross-head S, and provided with a bevel-gear, E', engaging a pinion, F', upon a shaft, G', mounted vertically in the shaft or arm R. Shaft G' has also a gear-wheel, H', engaging a pinion, I', upon a shaft, J', also mounted in shaft R, which is thus revolved very rapidly. Shaft J' carries the file or grinding-disk K'.

The frame-bar W is provided with bearings for the rear ends of a pair of longitudinally-sliding reciprocating stems, L', which are connected by pitmen M' with the cranks J of shaft I. The forward ends of the stems L' cross each other and are mounted in guides N', having laterally-projecting lugs, O', in which work set-screws P', bearing against the cross-head S, which is provided with sockets Q', in which the said guides are vertically adjustable by the said set-screws P'. To fix the guides securely in any position to which they may be adjusted, set-screws R' are provided, working in the front of the cross-head S and bearing against the stems or shanks S' of the guides. The front ends of the stems L' carry the files T', which are adapted to file the sides of the saw-teeth, against which they are held by springs U', secured to the guides N', and bearing against the opposite stems.

V' V' are a pair of arms projecting forward and upward from the front end of the base of the frame and forming guides for the saw, which is mounted for sharpening upon frame-work not shown in the drawings, and forming no part of the present invention.

In operation, when the main shaft is revolved, the cam K, acting against the arm M, serves to operate the rock-shaft L, while the shaft F and crank-shaft I, with intermediate mechanism, serve to operate the revolving and reciprocating files, respectively. The arm N of rock-shaft L serves on its forward stroke, through the pawl Q, to turn or feed the saw forward the space of one tooth. While this takes place, the arm U, making its rearward stroke, draws the slide R and cross-head S in a rearward direction, thus withdrawing the revolving file from the saw and causing the reciprocating files to be spread apart, so as to be temporarily disengaged from the saw. This latter operation is caused by the rearward motion of the cross-head, which supports the forward bearings of the stems or handles of said reciprocating files. On the rearward stroke of arm N the operation is reversed—the saw is left stationary and the several files are moved into engagement therewith.

To adjust the machine for saws of different sizes it is only necessary to adjust the plate O, carrying pawl Q, and the guides N', by which the level of the reciprocating files may be raised or lowered.

The machine may be operated by a crank or any other motive power.

I claim and desire to secure by Letters Patent of the United States—

1. In a machine for sharpening gin-saws, the combination of the main shaft, the rock-shaft L, the arm U, a longitudinally-sliding bar attached to a sliding cross-head, and carrying a revolving file, and a telescopic shaft serving with intermediate mechanism to transmit motion from said main shaft to said file, as set forth.

2. In a machine for sharpening gin-saws, the combination of the main shaft, a rock-shaft having an arm operated by a cam on said main shaft, a longitudinally-reciprocating bar operated by an arm extending from said rock-shaft, and carrying a revolving file, a telescopic shaft serving to transmit motion to said file from the main shaft, reciprocating files having the ends of their stems mounted in guides in a cross-head attached to the reciprocating bar, and a feed-pawl operated by the rock-shaft, as set forth.

3. In a machine for filing gin-saws, the combination, with the longitudinally-sliding bar carrying a revolving file, of reciprocating files arranged in sectional stocks that cross each other, and that have their rear ends mounted in the main frame and their forward ends in guides in a cross-head connected to the reciprocating bar, whereby said files are separated by the rearward movement of the cross-head, as set forth.

4. The combination, with the cross-head, of the vertically-adjustable guides having springs bearing against the reciprocating file-stems, the forward ends of which are mounted in said guides, as set forth.

In testimony that I claim the foregoing as my own I have hereunto fixed my signature in presence of two witnesses.

ALBERT P. GATHRIGHT.

Witnesses:
C. H. SMITH,
RUSSELL PORTER.